(12) United States Patent
Chuang

(10) Patent No.: US 9,950,217 B1
(45) Date of Patent: Apr. 24, 2018

(54) MULTILAYER COMPOSITE HIGH-ELASTIC ENVIRONMENTALLY-FRIENDLY BALL STRUCTURE

(71) Applicant: Cheng-Ming Chuang, Taoyuan (TW)

(72) Inventor: Cheng-Ming Chuang, Taoyuan (TW)

( * ) Notice: Subject to any disclaimer, the term of this patent is extended or adjusted under 35 U.S.C. 154(b) by 0 days.

(21) Appl. No.: 15/586,276

(22) Filed: May 4, 2017

(30) Foreign Application Priority Data

Mar. 17, 2017 (CN) ..................... 2017 2 0259128 U

(51) Int. Cl.
| | |
|---|---|
| *A63B 39/00* | (2006.01) |
| *A63B 39/06* | (2006.01) |
| *B32B 37/12* | (2006.01) |
| *B29C 65/00* | (2006.01) |
| *A63B 45/00* | (2006.01) |
| *B32B 37/14* | (2006.01) |
| *B29D 22/04* | (2006.01) |
| *B29K 9/06* | (2006.01) |
| *B29K 21/00* | (2006.01) |
| *B29K 23/00* | (2006.01) |
| *B29K 275/00* | (2006.01) |

(52) U.S. Cl.
CPC .............. *A63B 39/06* (2013.01); *B29C 66/71* (2013.01); *B32B 37/1284* (2013.01); *A63B 45/00* (2013.01); *A63B 2039/003* (2013.01); *B29C 66/54* (2013.01); *B29D 22/04* (2013.01); *B29K 2009/06* (2013.01); *B29K 2021/003* (2013.01); *B29K 2023/06* (2013.01); *B29K 2023/083* (2013.01); *B29K 2023/12* (2013.01); *B29K 2023/16* (2013.01); *B29K 2275/00* (2013.01); *B32B 2037/148* (2013.01)

(58) Field of Classification Search
CPC ... A63B 39/06; A63B 2039/003; A63B 45/00; A63B 39/00; A63B 39/08; B29C 66/71; B29C 66/54; B29D 22/04; A63F 9/0861
See application file for complete search history.

(56) References Cited

U.S. PATENT DOCUMENTS

| | | | | |
|---|---|---|---|---|
| 1,209,644 | A * | 12/1916 | Price ..................... | B29C 65/02 156/292 |
| RE15,108 | E * | 5/1921 | Fukuda .................. | A63B 37/00 156/228 |
| 1,530,410 | A * | 3/1925 | Reach .................... | A63B 37/00 156/228 |
| 1,631,317 | A * | 6/1927 | Fox ....................... | A63B 37/00 156/213 |
| 2,351,762 | A * | 6/1944 | Hoover .................. | A63B 43/00 446/269 |
| 2,653,818 | A * | 9/1953 | Tebbetts, Jr. ........... | A63B 39/00 428/161 |

(Continued)

*Primary Examiner* — Steven Wong

(57) ABSTRACT

The utility model discloses a multilayer composite high-elastic environmentally-friendly ball structure which comprises a base layer, a first coating layer, a second coating layer, a third coating layer and a fourth coating layer, wherein both the base layer and the first coating layer are formed by splicing a number of pieces into a hollow spherical structure, and a contact surface of two adjacent spliced pieces is a stepped surface in a "Z" shape or a concave-convex fitting surface in a "U" shape. The utility model have the advantages of simple manufacturing process, novel design, high stability, high reliability, high elasticity and long service life.

8 Claims, 4 Drawing Sheets

(56) References Cited

U.S. PATENT DOCUMENTS

| | | | | |
|---|---|---|---|---|
| 4,522,401 A | * | 6/1985 | Gustafson | A63F 9/0838 |
| | | | | 273/153 S |
| 5,711,729 A | * | 1/1998 | Chan | A63B 37/0098 |
| | | | | 473/600 |
| 5,788,591 A | * | 8/1998 | Decker | A63B 37/00 |
| | | | | 473/602 |
| 6,971,965 B1 | * | 12/2005 | Shishido | A63B 41/08 |
| | | | | 473/604 |
| 9,597,565 B2 | * | 3/2017 | Forutanpour | A63B 59/00 |
| 2001/0049311 A1 | * | 12/2001 | Lewis | A63B 43/06 |
| | | | | 473/570 |

* cited by examiner

MULTILAYER COMPOSITE HIGH-ELASTIC ENVIRONMENTALLY-FRIENDLY BALL STRUCTURE

BACKGROUND OF THE INVENTION

The present utility model relates to the technical field of sports goods and gifts, in particular to a multilayer composite high-elastic environmentally-friendly ball structure.

There are various kinds of elastic ball structures in the prior art, and the existing elastic balls are generally prepared from rubber or plastic materials.

The above elastic balls generally have the defects of long and complicated manufacturing process, high difficulty in quality supervision and high rejection rate in actual use.

BRIEF SUMMARY OF THE INVENTION

In view of the defects in the prior art, the present utility model aims to provide a multilayer composite high-elastic environmentally-friendly ball structure which has the advantages of simple manufacturing process, novel design, good stability and reliability, high strength, good elasticity and long service life. Moreover, the ball structure of the present utility model is permanently free of inflation and does not need to be repeatedly inflated, thereby eliminating the need for purchasing an inflation device.

In order to achieve the above objective, the present utility model is realized by the following technical solution.

A multilayer composite high-elastic environmentally-friendly ball structure, comprising:

a base layer formed by splicing several pieces into a hollow spherical structure, a contact surface of two adjacent spliced pieces of the base layer is a stepped surface in a "Z" shape or a concave-convex fitting surface in a "U" shape;

a first coating layer coated on the periphery of the base layer, the first coating layer is formed by splicing several pieces, and a contact surface of two adjacent spliced pieces of the first coating layer is a stepped surface in a "Z" shape or a concave-convex fitting surface in a "U" shape;

a second coating layer coated on the periphery of the first coating layer, the second coating layer is a fabric layer, and a first bonding layer is arranged between an inner surface of the second coating layer and an outer surface of the first coating layer for bonding the second coating layer with the first coating layer;

a third coating layer coated on the periphery of the second coating layer, a second bonding layer is arranged between an inner surface of the third coating layer and an outer surface of the second coating layer for bonding the third coating layer with the second coating layer; and a fourth coating layer coated on the periphery of the third coating layer, a third bonding layer is arranged between an inner surface of the fourth coating layer and an outer surface of the third coating layer for bonding the fourth coating layer with the third coating layer.

Wherein, the base layer is a PU foamed layer.

Wherein, the first coating layer is a PU foamed layer, an EVA foamed layer, a TPE foamed layer, a SBR foamed layer, a NBR foamed layer, an EPDM foamed layer, a SBL foamed layer, a POE foamed layer, a PE foamed layer or a TPR foamed layer.

Wherein, the third coating layer is an EVA foamed layer, a TPE foamed layer, a SBR foamed layer, a NBR foamed layer, an EPDM foamed layer, a SBL foamed layer, a POE foamed layer, a PE foamed layer or a TPR foamed layer.

Wherein, the fourth coating layer is an EVA foamed layer, a TPE foamed layer, a SBR foamed layer, a NBR foamed layer, an EPDM foamed layer, a SBL foamed layer, a POE foamed layer, a PE foamed layer, a TPR foamed layer or a leather layer.

Wherein, the first bonding layer, the second bonding layer and the third bonding layer are glue layers, respectively.

Wherein, the contact surface of two adjacent spliced pieces of the base layer is formed by glue bonding or hot-press lamination.

Wherein, the contact surface of two adjacent spliced pieces of the first coating layer is formed by glue bonding or hot press lamination.

The present utility model has the following beneficial effects: the multilayer composite high-elastic environmentally-friendly ball structure according to the present utility model comprising: 1) the base layer formed by splicing several pieces, the contact surface of two adjacent spliced pieces of the base layer is a stepped surface in a "Z" shape or a concave-convex fitting surface in a "U" shape; 2) the first coating layer coated on the periphery of the base layer, the first coating layer is formed by splicing several pieces, and the contact surface of two adjacent spliced pieces of the first coating layer is a stepped surface in a "Z" shape or a concave-convex fitting surface in a "U" shape; 3) the second coating layer coated on the periphery of the first coating layer, and the first and the second coating layers are bonded by the first bonding layer; 4) the third coating layer coated on the periphery of the second coating layer, and the second and the third coating layers are bonded by the second bonding layer; and 5) the fourth coating layer coated on the periphery of the third coating layer, and the third and the fourth coating layers are bonded by the third bonding layer. With the above structural design, the multilayer composite high-elastic environmentally-friendly ball structure according to the present utility model has the advantages of simple manufacturing process, novel design, good stability and reliability, high strength, good elasticity and long service life. Moreover, the ball structure of the present utility model is permanently free of inflation and does not need to be repeatedly inflated, thereby eliminating the need for purchasing an inflation device.

BRIEF DESCRIPTION OF THE DRAWINGS

The present utility model will be further illustrated below with reference to the accompanying drawings, but embodiments illustrated in the accompanying drawings are not intended to limit the present utility model in any way.

Included in FIGS. 1 to 4 are:
1—base layer; 2—first coating layer
3—second coating layer; 4—third coating layer
5—fourth coating layer; 6—first bonding layer
7—second bonding layer; 8—third bonding layer
9—stepped surface; 10—fitting surface.

DETAILED DESCRIPTION OF THE INVENTION

The present utility model will be described below in combination with the specific embodiments.

Figure 1:
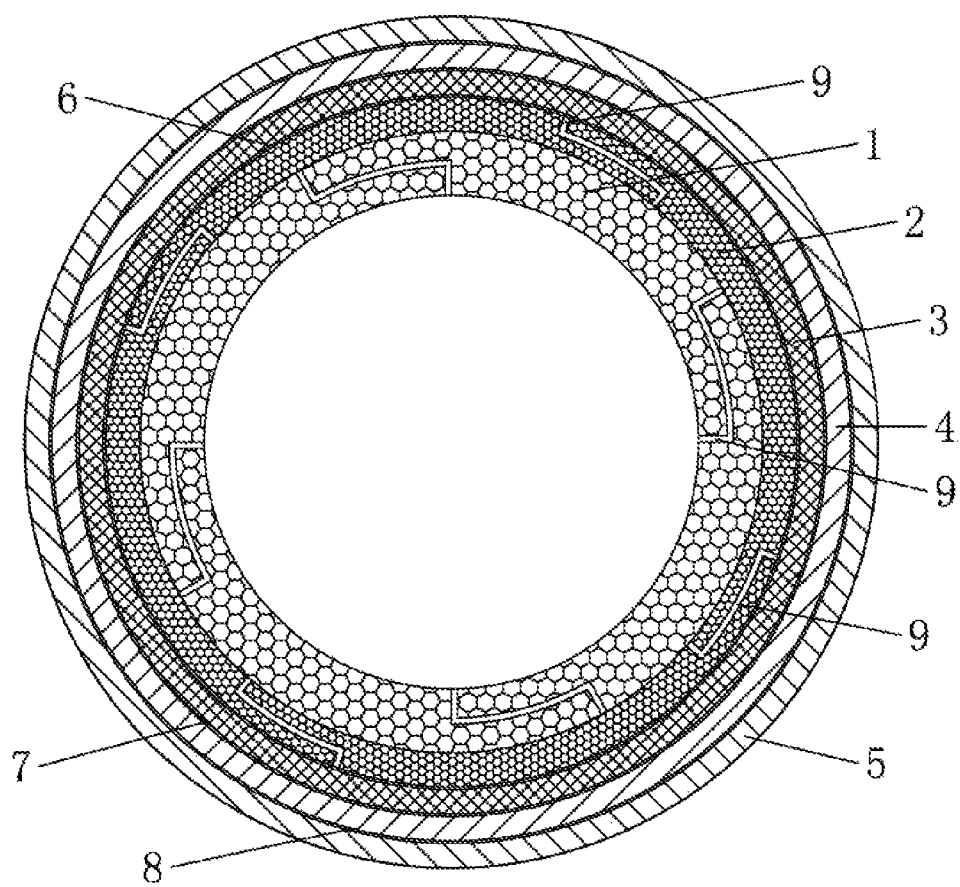
FIG. 1 is a structural schematic diagram of the first embodiment of the present utility model.
Figure 2:
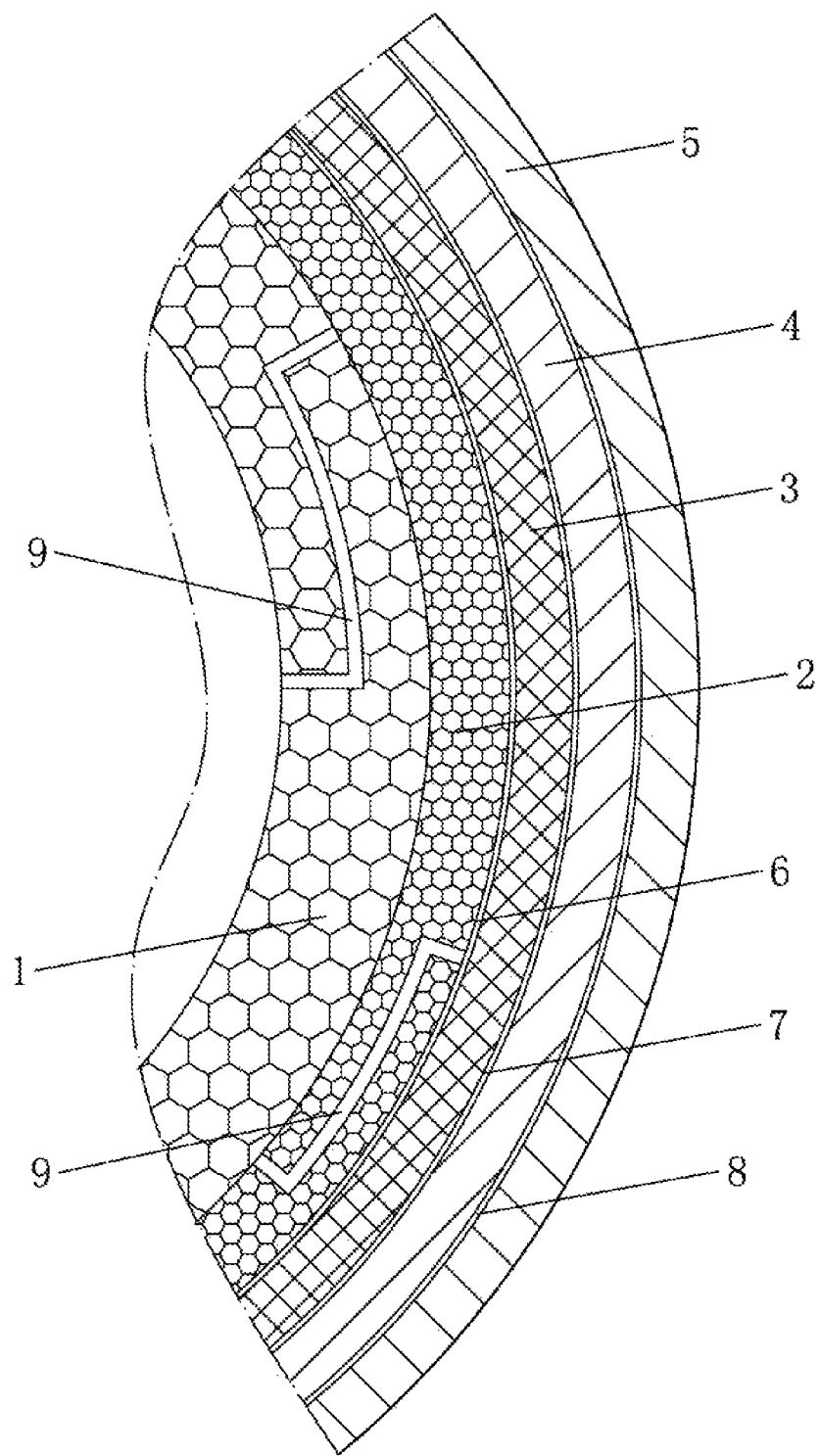
FIG. 2 is a partially enlarged schematic diagram of the first embodiment of the present utility model.
Figure 3:
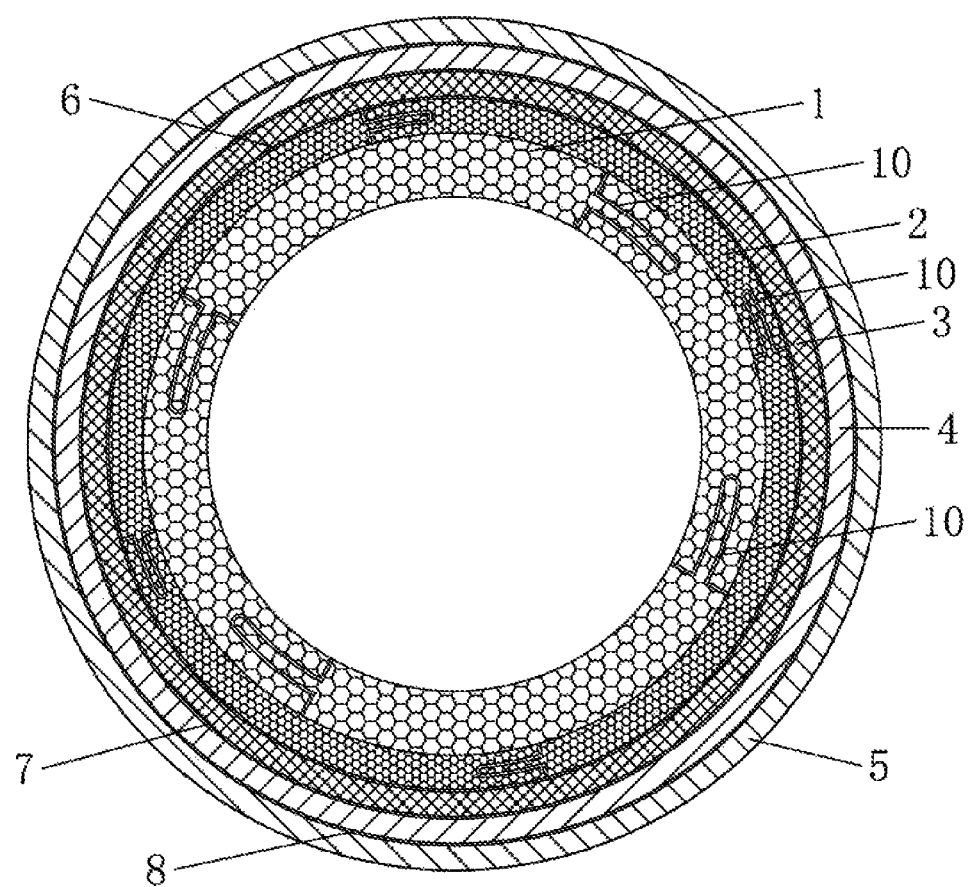
FIG. 3 is a structural schematic diagram of the second embodiment of the present utility model.
Figure 4:
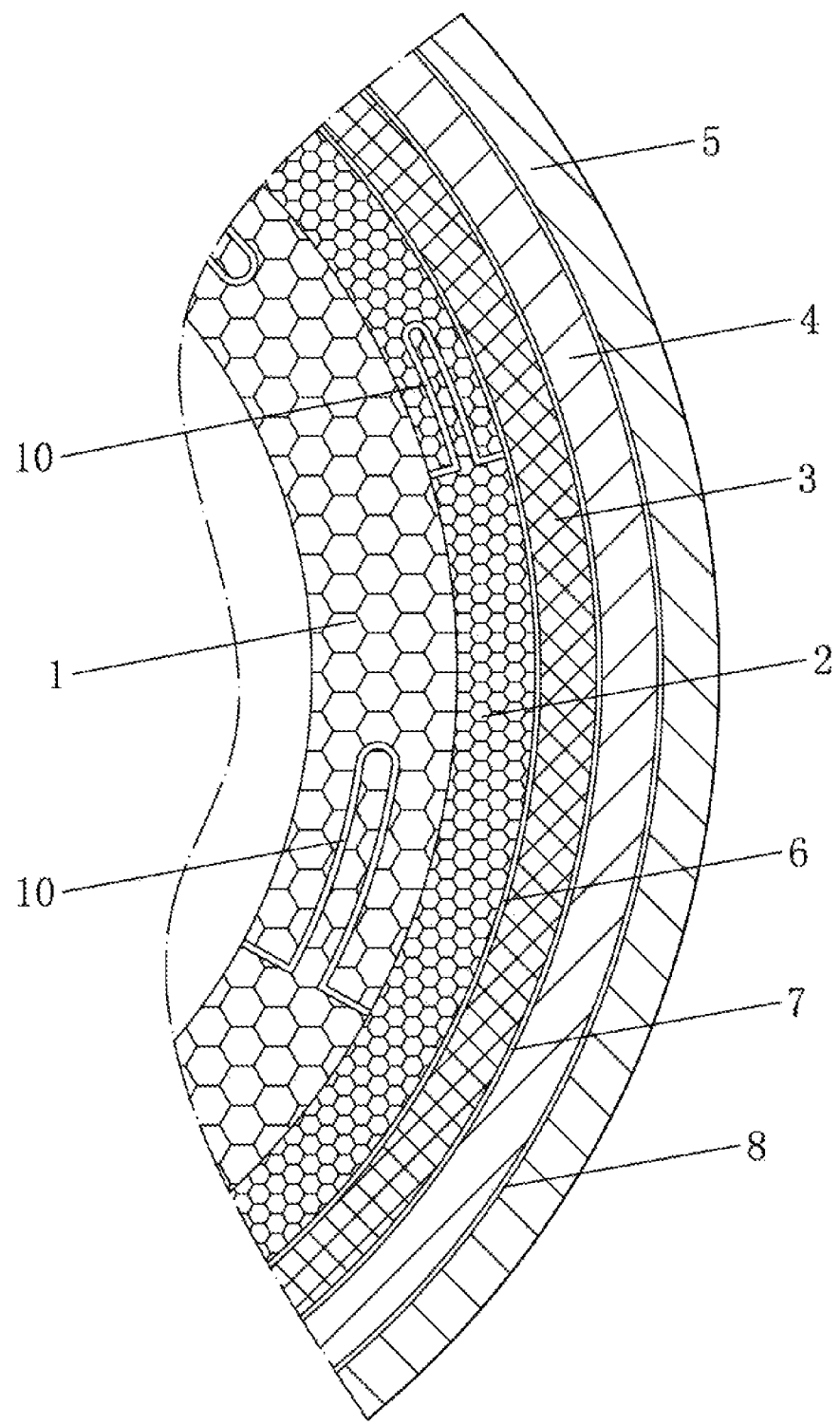
FIG. 4 is a partially enlarged schematic diagram of the second embodiment of the present utility model.

As shown in FIGS. 1 to 4, a multilayer composite high-elastic environmentally-friendly ball structure comprising:

a base layer 1 formed by splicing several pieces into a hollow spherical structure, a contact surface of two adjacent spliced pieces of the base layer 1 is a stepped surface 9 in a "Z" shape (as shown in FIGS. 1 and 2) or a concave-convex fitting surface 10 in a "U" shape (as shown in FIGS. 3 and 4);

a first coating layer 2 coated on the periphery of the base layer 1, the first coating layer 2 is formed by splicing several pieces, and a contact surface of two adjacent spliced pieces of the first coating layer 2 is a stepped surface 9 in a "Z" shape (as shown in FIGS. 1 and 2) or a concave-convex fitting surface 10 in a "U" shape (as shown in FIGS. 3 and 4);

a second coating layer 3 coated on the periphery of the first coating layer 2, the second coating layer 3 is a fabric layer, and a first bonding layer 6 is arranged between an inner surface of the second coating layer 3 and an outer surface of the first coating layer 2 for bonding the second coating layer 3 with the first coating layer 2;

a third coating layer 4 coated on the periphery of the second coating layer 3, a second bonding layer 7 is arranged between an inner surface of the third coating layer 4 and an outer surface of the second coating layer 3 for bonding the third coating layer 4 with the second coating layer 3; and a fourth coating layer 5 coated on the periphery of the third coating layer 4, a third bonding layer 8 is arranged between an inner surface of the fourth coating layer 5 and an outer surface of the third coating layer 4 for bonding the fourth coating layer 5 with the third coating layer 4.

Wherein, the base layer 1 of the present utility model may be prepared from a PU foamed material, namely the base layer 1 of the present utility model is a PU foamed layer. Of course, the above material does not constitute a limitation of the present utility model, namely the base layer 1 of the present utility model may also be prepared from other materials.

The first coating layer 2 of the present utility model may be prepared from a PU foamed material, an EVA foamed material, a TPE foamed material, a SBR foamed material, a NBR foamed material, an EPDM foamed material, a SBL foamed material, a POE foamed material, a PE foamed material or a TPR foamed material, namely the first coating layer 2 of the present utility model may be a PU foamed layer, an EVA foamed layer, a TPE foamed layer, a SBR foamed layer, a NBR foamed layer, an EPDM foamed layer, a SBL foamed layer, a POE foamed layer, a PE foamed layer or a TPR foamed layer.

It should be further explained that, the third coating layer 4 of the present utility model may be prepared from the EVA foamed material, the TPE foamed material, the SBR foamed material, the NBR foamed material, the EPDM foamed material, the SBL foamed material, the POE foamed material, the PE foamed material or the TPR foamed material, namely the third coating layer 4 of the present utility model may be an EVA foamed layer, a TPE foamed layer, a SBR foamed layer, a NBR foamed layer, an EPDM foamed layer, a SBL foamed layer, a POE foamed layer, a PE foamed layer or a TPR foamed layer. In addition, for the fourth coating layer 5 of the present utility model, it may be prepared from the EVA foamed material, the TPE foamed material, the SBR foamed material, the NBR foamed material, the EPDM foamed material, the SBL foamed material, the POE foamed material, the PE foamed material, the TPR foamed material or a leather material, namely the fourth coating layer 5 of the present utility model may be an EVA foamed layer, a TPE foamed layer, a SBR foamed layer, a NBR foamed layer, an EPDM foamed layer, a SBL foamed layer, a POE foamed layer, a PE foamed layer, a TPR foamed layer or a leather layer.

For the first bonding layer 6, the second bonding layer 7 and the third bonding layer 8 of the present utility model, they are essentially glue bonding layers, namely the first bonding layer 6, the second bonding layer 7 and the third bonding layer 8 of the present utility model are glue layers, respectively.

It should be further noted that, with respect to the base layer 1 of the present utility model, since the contact surface of two adjacent spliced pieces of the base layer 1 is the stepped surface 9 in a "Z" shape or the concave-convex fitting surface 10 in a "U" shape, such a splicing structural design enables a more stable and secure contact between two adjacent spliced pieces of the base layer 1, which in turn makes the whole base layer 1 more stable. Likewise, with respect to the first coating layer 2 of the present utility model, since the contact surface of two adjacent spliced pieces of the first coating layer 2 is the stepped surface 9 in a "Z" shape or the concave-convex fitting surface 10 in a "U" shape, such a splicing structural design enables a more stable and secure contact between two adjacent spliced pieces of the first coating layer 2, which in turn makes the whole first coating layer 2 more stable.

Furthermore, with respect to the fabric layer of the present utility model, on the one hand it can effectively enhance the strength of the whole elastic ball, and on the other hand it can effectively enhance the elastic force and elasticity of the whole elastic ball.

It can be seen from the above description that, with the above structural design, the multilayer composite high-elastic environmentally-friendly ball structure according to the present utility model has the advantages of simple manufacturing process, novel design, good stability and reliability, high strength, good elasticity and long service life. Moreover, the ball structure of the present utility model is permanently free of inflation and does not need to be repeatedly inflated, thereby eliminating the need for purchasing an inflation device.

The above are merely preferred embodiments of the present utility model. Modifications may be made to the specific implementation and application range thereof by those skilled in the art according to the concept of the present utility model, and the description of the present utility model should not be construed as limitation to the present utility model.

What is claimed is:

1. A multilayer composite ball structure, characterized in that it comprises:

a base layer (1) formed by splicing several pieces into a hollow spherical structure, a contact surface of two adjacent spliced pieces of the base layer (1) is a stepped surface (9) in a "Z" shape or a concave-convex fitting surface (10) in a "U" shape;

a first coating layer (2) coated on the periphery of the base layer (1), the first coating layer (2) is formed by splicing several pieces, and a contact surface of two adjacent spliced pieces of the first coating layer (2) is a stepped surface (9) in a "Z" shape or a concave-convex fitting surface (10) in a "U" shape;

a second coating layer (3) coated on the periphery of the first coating layer (2), the second coating layer (3) is a fabric layer, and a first bonding layer (6) is arranged between an inner surface of the second coating layer (3)

and an outer surface of the first coating layer (2) for bonding the second coating layer (3) with the first coating layer (2);

a third coating layer (4) coated on the periphery of the second coating layer (3), a second bonding layer (7) is arranged between an inner surface of the third coating layer (4) and an outer surface of the second coating layer (3) for bonding the third coating layer (4) with the second coating layer (3); and a fourth coating layer (5) coated on the periphery of the third coating layer (4), a third bonding layer (8) is arranged between an inner surface of the fourth coating layer (5) and an outer surface of the third coating layer (4) for bonding the fourth coating layer (5) with the third coating layer (4).

2. The multilayer composite ball structure of claim 1, characterized in that the base layer (1) is a PU foamed layer.

3. The multilayer composite ball structure of claim 1, characterized in that the first coating layer (2) is a PU foamed layer, an EVA foamed layer, a TPE foamed layer, a SBR foamed layer, a NBR foamed layer, an EPDM foamed layer, a SBL foamed layer, a POE foamed layer, a PE foamed layer or a TPR foamed layer.

4. The multilayer composite ball structure of claim 1, characterized in that the third coating layer (4) is an EVA foamed layer, a TPE foamed layer, a SBR foamed layer, a NBR foamed layer, an EPDM foamed layer, a SBL foamed layer, a POE foamed layer, a PE foamed layer or a TPR foamed layer.

5. The multilayer composite ball structure of claim 1, characterized in that the fourth coating layer (5) is an EVA foamed layer, a TPE foamed layer, a SBR foamed layer, a NBR foamed layer, an EPDM foamed layer, a SBL foamed layer, a POE foamed layer, a PE foamed layer, a TPR foamed layer or a leather layer.

6. The multilayer composite ball structure of claim 1, characterized in that the first bonding layer (6), the second bonding layer (7) and the third bonding layer (8) are glue layers, respectively.

7. The multilayer composite ball structure of claim 1, characterized in that the contact surface of two adjacent spliced pieces of the base layer (1) is bonded by glue or fitting by hot-press.

8. The multilayer composite ball structure of claim 1, characterized in that the contact surface of two adjacent spliced pieces of the first coating layer (2) is formed by glue bonding or hot-press lamination.

* * * * *